United States Patent [19]

Pruznick et al.

[11] 3,996,421
[45] Dec. 7, 1976

[54] TELEVISION DISPLAY UTILIZING LOCAL AREA BRIGHTNESS CONTROL

[75] Inventors: Michael D. Pruznick, Huntington Beach; David J. Ketcham; Roger W. Lowe, both of Lakewood; Eugene W. Opittek, Santa Ana, all of Calif.

[73] Assignee: Hughes Aircraft Company, Culver City, Calif.

[22] Filed: Sept. 2, 1975

[21] Appl. No.: 609,753

[52] U.S. Cl. .............................. 178/7.3 D; 178/6.8; 178/DIG. 34
[51] Int. Cl.$^2$ ...................... H04N 5/14; H04N 5/20
[58] Field of Search ............. 178/6.8, 7.3 D, 7.5 D, 178/DIG. 34, DIG. 22, 7.3 R, 7.5 R, DIG. 8, DIG. 21, DIG. 36

[56] References Cited

UNITED STATES PATENTS

| | | | |
|---|---|---|---|
| 3,437,873 | 4/1969 | Eggert | 178/7.5 D |
| 3,707,598 | 12/1972 | Scarbrough | 178/DIG. 21 |
| 3,891,798 | 6/1975 | Marcus | 178/DIG. 34 |

*Primary Examiner*—Robert L. Richardson
*Attorney, Agent, or Firm*—Rafael A. Cardenas; William H. MacAllister

[57] ABSTRACT

A raster display system is disclosed which utilizes a "sliding window" effect for enhancing the contrast of an image by adjusting the video gain and brightness within the window. The television display may have a raster having 512 lines and 512 elements per line. The display system utilizing digital circuitry calculates the average brightness of a "window" having a predetermined number of elements per display line and several parallel display lines, such as, for example, eight lines and eight elements per line. Thus, an eight-by-eight window is presented. The average brightness of the window is subtracted from the brightness of a centrally located element which results in the relative brightness of the element. This relative brightness signal is multiplied by a gain factor and the product is applied to an output circuit for controlling the bias of a central element of the window. The window is moved one element over and a second computation is made which in turn results in a new bias being set for a second element centrally located within the second window. The window is slid one element at a time and a bias adjustment is made for each centrally located element until all of the elements in the first eight lines have been entered into the computation. The window is then deflected one line down and back to the first eight elements of the second through ninth display lines. The process of sliding the window to the right continues again until all the elements within this second set of sliding windows is completed. Thus, the window slides across the display one element at a time and down one line at a time at the end of each set of lines until all of the elements in the display have entered into the computation.

7 Claims, 8 Drawing Figures

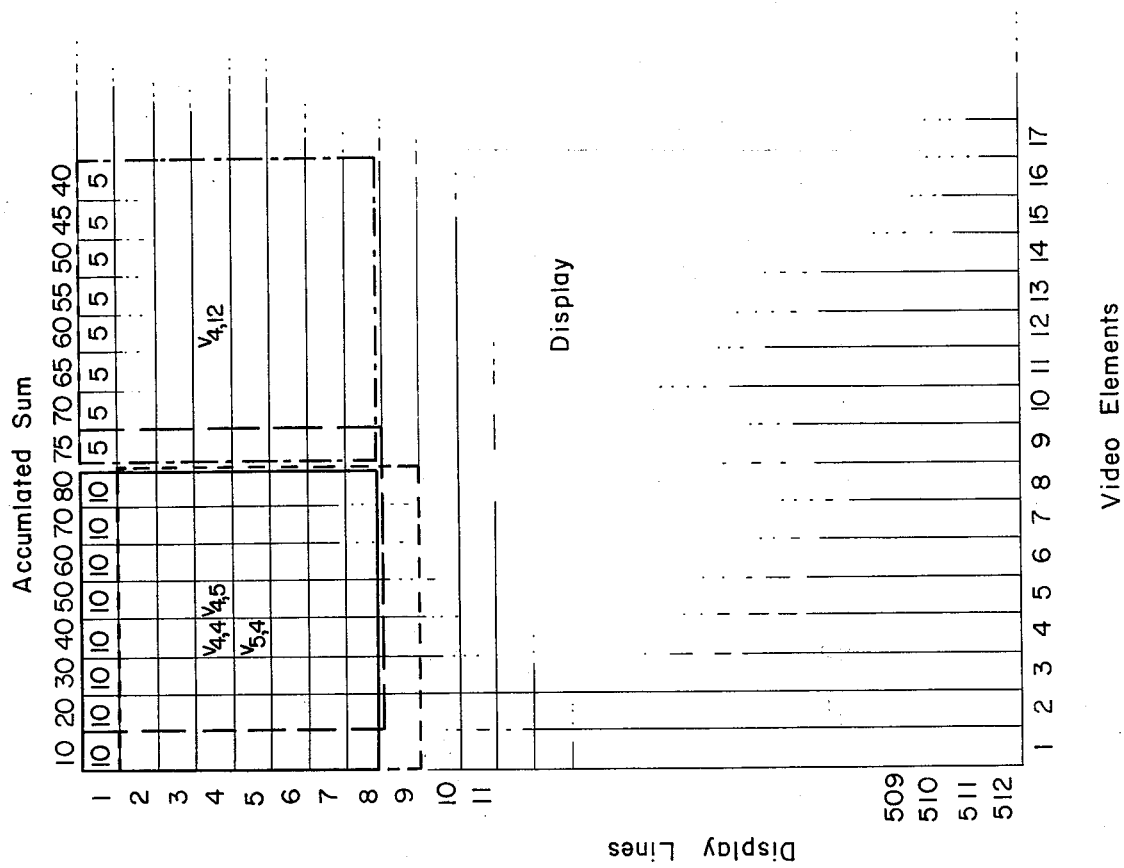

3,996,421

TELEVISION DISPLAY UTILIZING LOCAL AREA BRIGHTNESS CONTROL

RELATION TO A GOVERNMENT CONTRACT

The invention herein disclosed was made under or in the course of a contract with the Department of the Navy.

FIELD OF THE INVENTION

This invention relates generally to display systems and in particular, to television type raster display systems, utilizing digital techniques enhancing the brightness of an image.

DESCRIPTION OF THE PRIOR ART

Television image enhancement systems of the type herein disclosed are not generally known in the prior art. However, simple techniques do exist which marginally improve the brightness of a raster display. One method is to compute the average brightness value for the entire first raster and use that value for adjusting brightness of individual element within the succeeding raster. This method presupposes that the average brightness from raster to raster will be the same, and thus, the average brightness of the preceding raster is used for adjusting the brightness of a subsequent raster. Although the overall brightness of a raster or frame is increased, the individual image detail, which is more important, is not enhanced.

Another method is called the frequency pre-enhancement method. Frequency pre-enhancement utilizes a filter for applying a greater gain to the higher frequencies than the lower frequencies. This technique increases the "sharpness" of a display image by increasing the contrast between light and dark regions. This technique, however, is difficult to implement since a large number of circuits must be used. Also, in applying a greater gain to the higher frequencies an element of artificiality is introduced which is not necessarily present in the actual scene. This also causes some distortion of the image.

Still another technique that has been used to enhance a display image is the "clamping method" which amplifies the maximum and minimum brightness of the elements within a particular display line. The technique, although easy to implement, also presents a distorted image. For example, where a particular line has an extensive number of elements that are very dark and other elements that are bright, the clamping method tends to darken the already dark portions of the image and saturate, or "burn out", the light portions of the display line. Another drawback with this particular method is that the enhancement of a particular line has little or no effect on preceding or subsequent lines. Thus, details per se may not be enhanced.

SUMMARY OF THE INVENTION

Accordingly, it is the object of the present invention to provide a simple, reliable and economical system for enhancing the brightness and contrast of a display image.

It is another object of the present invention to provide enhancement of details within an image.

It is yet another object of the present invention to provide an image enhancing system which enhances the brightness of a particular element based upon the average brightness of the elements immediately surrounding it.

In accordance with the foregoing objects, a raster display image enhancing system includes a video input network providing parallel video signals representing a predetermined number of corresponding elements in a first set of predetermined parallel lines. Thus, a "window" is defined. The window is slid horizontally by presenting succeeding corresponding elements and eliminating the earliest corresponding elements until all the elements have come within the window. The elements within the window are applied to a variance network which computes the gain for a centrally located video element. The gain factor is multiplied by the central window element. The window is slid a preselected number of elements along the line and a new variance computation is performed which in turn results in resetting the bias and gain for the element centrally located within the succeeding window. The window is slid along until all the elements in the first set of parallel display lines enter into the variance computation. At the end of the first set of parallel lines, the window is moved down a preselected number of lines and slid back to the beginning of a second set of parallel lines. The bias and gain for each of the centrally located elements is adjusted individually for such elements until all the elements of a raster have entered within the window.

BRIEF DESCRIPTION OF THE DRAWINGS

FIG. 6 is a schematic block diagram illustrating a average network.

DETAILED DESCRIPTION OF THE DRAWINGS

Figure 1:
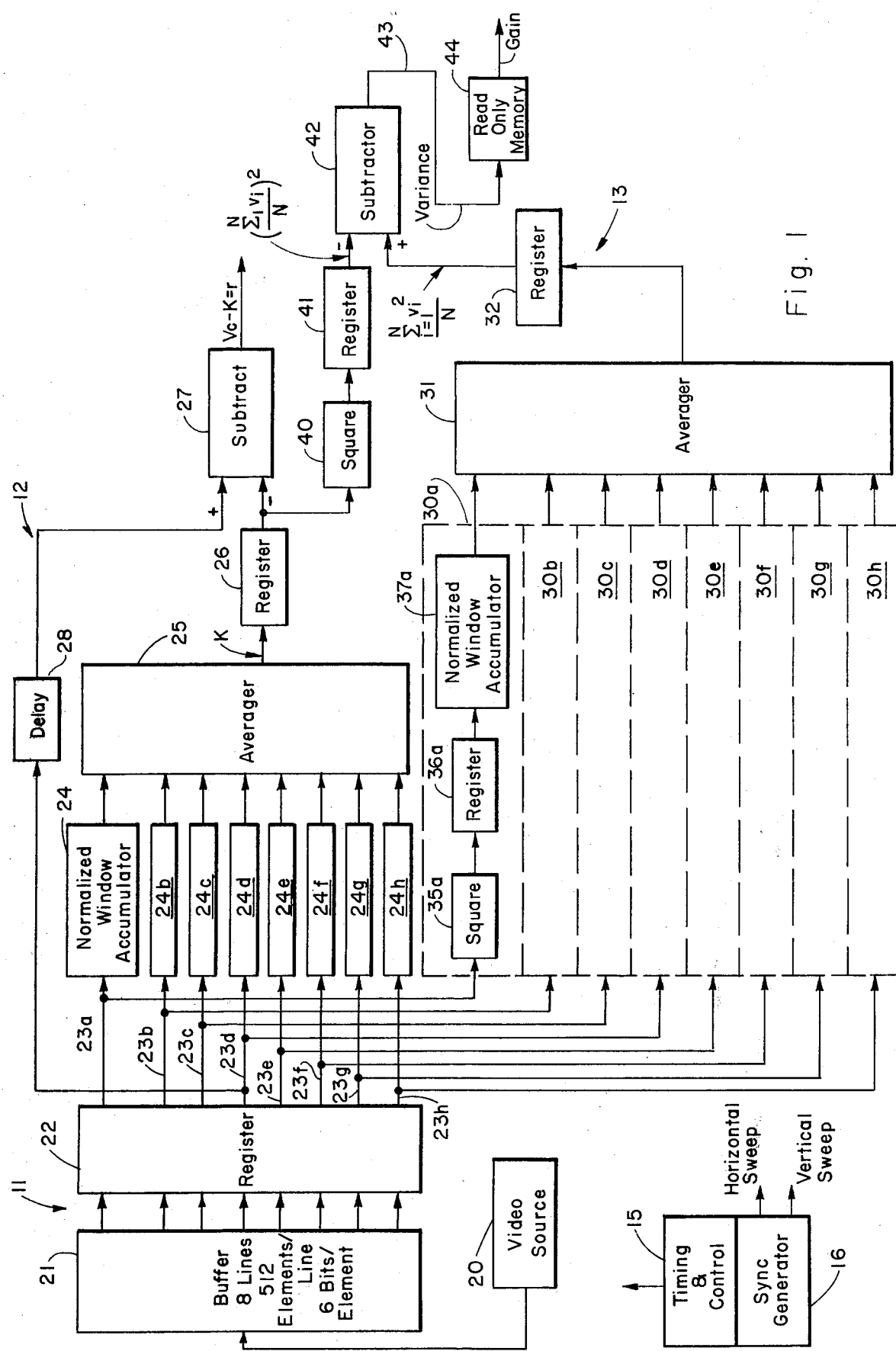
FIGS. 1 and 2 are schematic block diagrams illustrating an embodiment according to the present invention.

FIG. 1 includes a video input network 11 connected to a relative brightness network 12 and a variance network 13. The output terminals of the networks 12 and 13 are coupled to a video control network 14 illustrated in FIG. 2. A timing and control network 15 provides the clock signals to the circuits of the present invention. A sync generator 16 which provide the horizontal sweep and vertical deflection of the electron beam in a cathode ray tube.

The video input network 11 includes a source of video signals 20 such as a TV camera, in infrared energy detector, or any other television-compatible input source. The source 20 is connected to a video input buffer 21 via a six-lead composite cable. The source 20 provides a serial input video data to the buffer 21. The buffer 21 may be a recirculating shift register memory which can store eight lines of video data, such as advanced microdevices, Model Numbers AM2803. Eight lines of video data each line having 512 elements, and each element having six intensity, or brightness, bits must be stored in the buffers 21. All of the video data for forming a raster on a display is processed through the buffer 21 which holds only the latest 8 lines of video data at a time. As the source 20 provides data to the buffer 21, the buffer is being continually updated.

Figure 3:
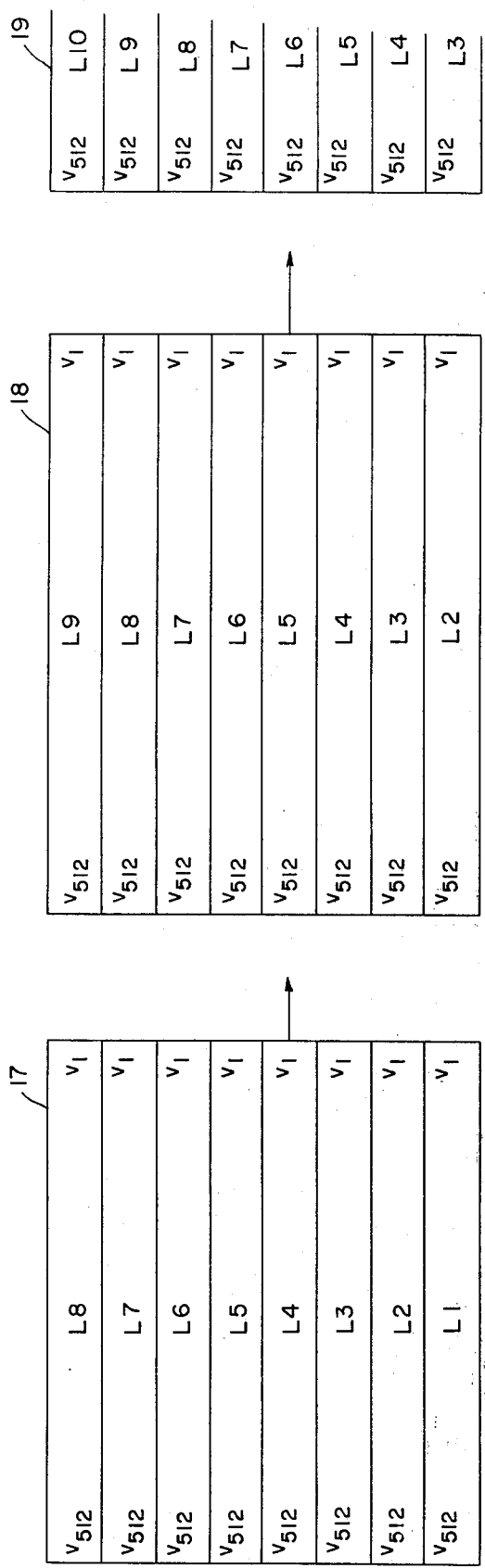
FIG. 3 is a flow chart diagram illustrating the data flow through an input buffer.

Referred briefly to FIG. 3, a flow chart illustrates the operation of the buffer 21. Video data is provided to the buffer 21 in serial format and the buffer 21 stores the data in parallel format commencing with the first line L1 and continuing until the eight line L8 has been stored. The parallel format is illustrated in chart 17, wherein the first line of video data L1 is at the bottom and the eight line of data L8 is at the top of the chart. The video elements for each line are arranged serially with the first element $v$, at the leading edge and the last element $v_{512}$ at the trailing edge. The buffer 21 is updated by shifting the first line of data L1 out and replacing it with the second line L2, which is in turn replaced by L3, etc, etc. The update buffer is illustrated in chart 18 which stored lines L2–L9. On the tenth horizontal sweep of the source 20 the buffer 21 is again updated when the second display line L2 is shifted out and the tenth display line L10 is shifted in to replace L9. This may be seen in chart 19. Thus, the buffer 21 stores up to 8 lines of video data, each line having 512 bideo elements. The buffer 21 is continually updated by storing the latest lines of data and shifting out the oldest.

The video input network 11 also includes an eight-channel shift register 22 connected to the output terminal of buffer 21 by eight composite leads. Each of the composite leads includes 6 individual leads for transferring the stored video data which has 6 intensity or brightness bits. The buffer 21 shifts 8 corresponding and parallel video elements at a time to the register 22 in response to each clock pulse. The register 22 stores corresponding video elements of the eight parallel display lines in eight parallel channels. For example, at time $t_1$, the first elements of lines 1 through 8 are stored in the register 22; at time $t_2$, the second elements are stored in the register 22 while the first elements are shifted out; at time $t_3$, the third elements of lines 1–8 are stored, etc. A register such as register 22 is required to compensate for the delay time between a clock pulse for transferring information from the buffer 21 and the time that the information is actually transferred out. Thus, the register 22 stores 48 bits of video data during any clock pulse for further processing.

The relative brightness network 12 includes 8 parallel normalized window accumulator networks 24a – 24h connected to the eight output channels of the register 22 via 8 composite leads 23a–23h, respectively. The output terminals of the accumulators 24a – 24h are connected to an average network 25. The network 12 also includes a register 26 connecting the output terminal of the average network 25 with the minus terminal of a subtractor 27. A delay shift register 28 connects the fourth channel of the register 22 with the plus terminal of the subtractor 27.

Referring again to the accumulators 24a – 24h, each of these networks are structurally and functionally identical and therefore only the accumulator 24a will be described in detail. The accumulator 24a receives one video element from the first channel of the register 22, in response to each clock pulse. Up to eight serial video elements are accumulated by the accumulator 24a. After the eight video elements are accumulated, the accumulator 24a applies an output signal to the average network 25. The output signal from the accumulator 24a represents the average intensity of the eight elements within the window, therefore the name normalized window accumulator. Thereafter, an output signal is applied for each new position of the window. As the ninth video element is shifted into the accumulator 24a, the first video element is shifted out. Thus, the second through ninth elements are accumulated. When the tenth video element is shifted into the accumulator 24a, the second element is shifted out and only the third through the eleventh elements are accumulated. Thus, the normalized window accumulator 24a slides horizontally along a display line one element at a time. The window may be shifted more than one video element at a time depending upon the accuracy desired. But, greater image enhancement is achieved if the window moves only one element at a time.

The window may enclose a greater or lesser number of elements and the invention is not limited to eight elements per line. For ease of implementation, however, the number 8 is suitable for binary division and multiplication and therefore eight elements are within the window.

The accumulators 24b – 24h are coupled in parallel with accumulator 24a and each accumulats corresponding video elements simultaneously for each of the parallel display lines. Each of the accumulators 24a – 24h provides an average intensity output signal over each of their respective 8 elements. A "window" is thus presented. A more detailed discussion of the circuit of a normalized window accumulator 24a may be found below.

The average network 25 adds the average intensities from the accumulators 24a – 24h and provides an output signal of the average brightness of the eight lines. The network 25 provides an output signal in response to each new accumulation of the accumulators 24a – 24h. Thus, the network 25 is updated once each clock pulse whenever the accumulators 24a – 24h are full. The delay shift register 28 stores one video element from the fourth display line with each clock pulse. Up to four video elements are stored at a time since the register 28 has a 4 bit delay. For example, on the fifth clock pulse a fifth video element is stored and the first is shifted out. The delay is timed such that the average brightness signal from the register 26 is shifted into the subtractor 27 at the same time the fourth element of the fourth line is shifted into the subtractor 27. Thus the average or mean brightness of all the elements defining a particular window is subtracted from brightness of the center element within that window.

The subtractor 27 subtracts the average brightness K of all the elements within the 8 by 8 window from the center element and provides an output signal called the relative brightness, $r$.

A register 26 is connected to the average network 25 and holds the average intensity output of the average network 25. The register 26 is in turn connected to the minus terminal of a subtract network 27. The plus terminal of the subtractor network 27 is connected to the fourth output channel of the register 22 by a register 28.

The register 22 is also connected to the variance network 13. The variance network includes eight parallel average intensity squared networks, 30a–30h, connected to the eight channels of the register 22 via leads 23a–23h, respectively. The output terminals of the networks 30a–30h are connected to an average network 31, which in turn is coupled to a register 32.

The networks 30a–30h are identical in structure and function and, therefore, only the network 30a will be discussed in detail. The network 30a includes a square circuit 35a having an input terminal connected to the first channel of the register 22 and the output terminal is connected to a register 36a. The register 36a is connected to a normalized window accumulator 37a, which is simular to the accumulator 24a discussed above. The only difference is the accumulator 37a has a greater capacity since it deals with larger numbers. The square circuit 35a may be a two input terminal multipler, that receives the same input signal at both the input terminals, for example. A video element from the register 22 is squared by the square circuit 35a and transferred to the register 36a, which holds the squared term until it can be further processed by the accumulator 37a. The accumulator 37a sums eight squared elements of a line which are within a particular window and then provides an output signal when all eight elements have been squared. The eight parallel networks 37a–37h function in parallel and accumulate the squared sum of corresponding elements of eight parallel display lines within a particular window. The average network 31 provides the average or mean value of the square of the 64 elements within the particular window being computed in response to the networks 30a–30h. The output of the average circuit 31 is stored in the register 32. The register 32 is in turn connected to the plus terminal of a subtractor 42.

The variance network 13 also includes a square circuit 40 which is connected to the output terminal of the register 26. The square circuit 40 may be a multiplier circuit having two input terminals to which the same number is applied, for example. The output terminal of the square circuit 40 is connected to a register 41 which stores the output from the former. The minus terminal of a subtractor 42 is connected to the output of the register 41, and the plus terminal is connected to the register 32. The output terminal of the subtract circuit 42 is connected to read only memory (ROM) 44 by lead 43. The ROM 44 determines the gain which will in turn determine the bias level of the center element of a window.

Figure 4:
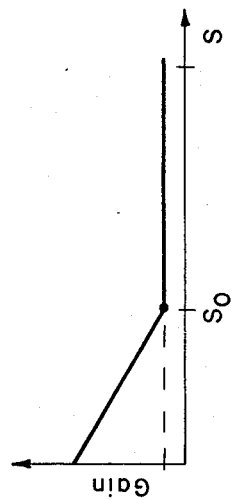
FIG. 4 is a diagram illustrating the output response of a read only memory.

Referring briefly to FIG. 4, the output response of a ROM 44 is now described. The graph represents the gain function applied as a result of the standard deviation of the brightness of the individual video elements within a window. The abscissa represents standard deviation, while the ordinate represents the gain $g$ that will be used to determine the gain of the central element. The goal of applying varying degrees of gain to the individual center elements is to enhance the difference between the center element and its surroundings. For example, a center element having a small relative brightness between it and the surrounding elements will have greater gain applied than the center element having a larger difference. The center element having an already large relative brightness need not be further enhanced. The output of the ROM 44 may be any other statistical formula which uses the variance as a variable.

Figure 2:
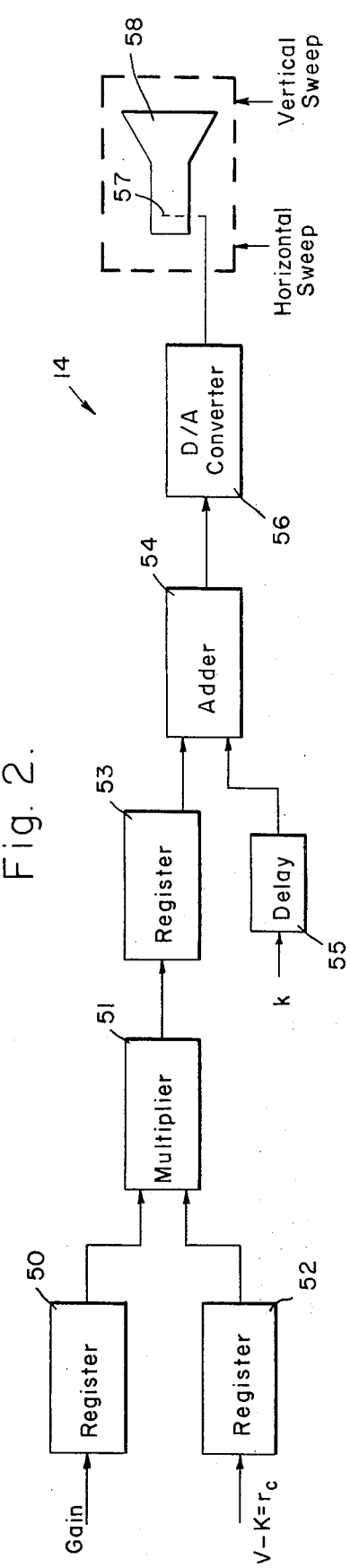

The output terminal of the ROM 44 is connected to video control network 14 of FIG. 2. The video control network 14 includes a register 50 connected to one input terminal of a multiplier 51, the other input terminal is connected to a register 52. The input terminal of the register 52 is connected to the output terminal of the subtractor 27. The multiplier 51 multiplies the gain G times the relative brightness $r$ and applies that product to a register 53. The register 53 holds that product until it is needed for further processing. The register 53 is connected to an input terminal of an adder 54. An 8-bit delay register 55 is connected to the second input terminal of the adder 54. The input terminal of the delay register 55 is connected to the output terminal of register 26 of FIG. 1. The delay register 55 delays the average brightness signal of a window so that the information from the register 53 and the line 55 are added at the proper time. The output of the adder 54 is connected to a digital/analog (D/A) converter 56. The output of the D/A converter 56 is connected to the intensity grid 57 of a display screen 58 for setting the bias of each individual center element of each window.

Figure 5:
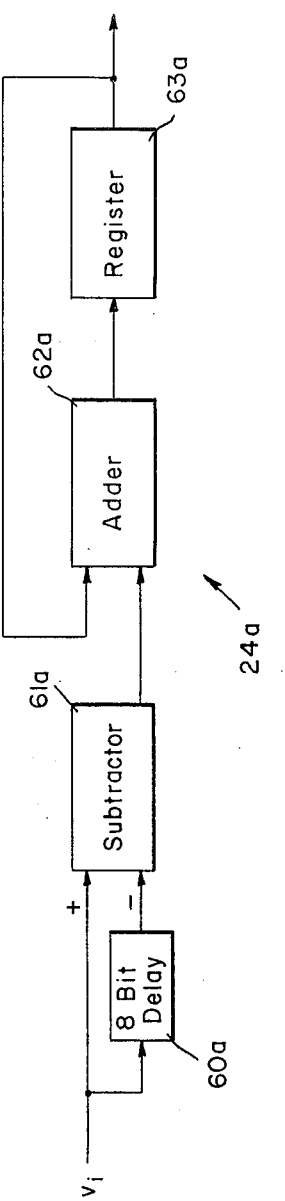
FIG. 5 is a schematic block diagram illustrating, in detail, a normalized window accumulator of FIG. 1.

Referring now to FIG. 5, a normalized window accumulator 24a according to the present invention, is now described. The accumulator 24a includes an 8 bit delay register 60a connected to the minus terminal of a subtractor 61a. The plus terminal of the subtractor 61a and the input terminal of the delay register 60a are connected to the first channel of the register 22 via composite lead 23a. The delay register 60a in combination with the subtractor 61a provides the horizontal sliding function of the trailing edge of a window. For example, the first video element is applied to the plus terminal of the subtractor 61a and the 8 bit register 60a. The subtractor 61a provides an output signal of the first element. The second, third, fourth, etc., elements are applied to the subtractor 61a and are likewise provided at the output. Also the second, third, fourth, etc., video elements are being serially stored in the delay register 60a. As the ninth video element is applied to the subtractor 61a, the first video element in the register 60a is subtracted from the ninth element and an output value is provided. Thus, the register 60a and the subtractor 61a cause the trailing edge of the window to slide to the right.

The output terminal of the subtractor 61a is connected to one input terminal of an adder 62a. The adder output terminal is connected to a register 63a whose output terminal is connected to the second input of the adder 62a. The output terminal of the register 63a is also connected to the average circuit 25 of FIG. 1. The combination of the adder 62a and the register 63a provides the horizontal sliding motion of the leading edge of the window. For example, the video input signal from the subtractor 61a is applied to the adder 62a. The output of the adder is applied to the register 63a which stores the video data until the next clock pulse. The register 63a feeds the video signal back to the second input terminal of the adder 62a which adds the stored data to any new incoming signal, which new sum is stored in the register 63a. Thus the sum in the adder 62a is updated as the leading edge of the window slides from left to right.

The accumulator of FIG. 5 also normalizes the accumulated value of the eight elements it stores by dividing the output signal by 8. The input signal to the subtractor 61a and the delay line 60a is supplied on six input leads. The output from the register 63a, however, should be provided on nine output leads instead of six because the accumulated value is greater than the individual input signals. Instead of providing the average circuit 25 with the output of all nine leads, only six leads are used, which represent the six most significant bits. The three least significant bits are not connected between the register 63a and the average circuit 25. All nine leads, however, are connected between the register 63a and the adder 62a for providing accuracy to the addition of the adder 62a. The output is averaged over eight video elements when the binary point is moved three positions to the left. Thus binary division by 8 is accomplished by using the 6 most significant bits instead of all nine leads.

The normalized window accumulator 37a of the intensity squared network 30a is similar to the accumulator 24a. The only difference is that the accumulator 37a has twice the storage capacity as the accumulator 24a since the former must operate on numbers that are twice as large.

Referring now to FIG. 6, a display screen is illustrated having 512 video elements per line and 512 lines per frame. The video elements are identified along the bottom of the display while the display lines are indentified along the left edge. The numerals above the display represent the accumulated sums of the elements of the first display line within the register 63a. The numerals along display line 1, elements 1–16, represent arbitrary intensities of the video elements in those positions. Thsu, for purposes of discussion the first eight elements of line 1 have an intensity of 10 while the second eight elements have an intensity of 5. The solid line represents a first window of a first set of windows, about lines 1 through 8 and elements 1 through 8. The long dashed line represents a second window of the first set of windows, about lines 1 through 8 and elements 2 through 9. The alternating long and short dashed line represents a ninth window. The short dashed lines represent a first window about a second set of windows, about lines 2 through 9 and elements 1 through 8.

The operation of the normalized window accumulator 24a of FIG. 5 is now discussed with reference to that figure and with reference to FIG. 6. It should be understood that although only one normalized window accumulator 24a is described in detail, there are seven others which operate in parallel. Thus, an eight-line window is presented. Initially, for example, accumulator 24a contains video data for the first display line. Accumulator 24b contains the video for the second display line, etc., etc. Accumulator 24h contains the video for the eighth display line.

During the first clock pulse from the timing and control network 15, the first video element is provided to the subtractor 61a and to the delay register 60a. The subtractor 61a then applies the difference value, 10, to the adder 62a. The adder 62a applies the signal output to the register 63a which stores the first accumulation, 10.

During the second clock pulse, a second video element is provided to the subtractor 61a and the delay line 60a. The subtractor 60a provides the second element to the adder 62a at the same time the register 63a provides the adder 62a with the first accumulation which was stored during the first pulse. The adder 62a adds the first and second elements and stores the sum of 20 in the register 63a.

During a third clock pulse, a third video element is provided to the subtractor 61a, the delay register 60a and the adder 62a. The adder 62a adds the third video element to the first two and stores the sum of 30 in the register 63a. Thus, the video elements are accumulated as the leading edge of the window slides from left to right.

During an eighth clock pulse, an eighth video element is applied to the subtractor 61a, the delay line 60 and the adder 62a. The adder 62a adds the eighth video element to the first seven elements and stores the sum of 80 in the register 63a.

During the ninth clock pulse, the ninth video element is provided to the subtractor 61a and the delay line 60a and adder 62a. At the same time the value 10, of the first video element, stored in the delay line 60a is subtracted from the value of the ninth video element and that output, −5, is provided to the adder 62a. The register 63a applies the accumulated sum of 80 to the adder 62a. The adder thereupon provides an output signal representing 75 to the register 63a.

With each new video element, a new subtraction, addition and accumulation takes place such that the window slides from left to the right. Thus, when the ninth through sixteenth elements of the first display line are within the window the accumulator contains a total intensity of 40 as illustrated by the alternating short and long dashed line.

When the window completes a scan of the elements 1 through 512 of lines 1 through 8, the buffer 21 is updated and lines 2 through 9 are within the window as illustrated by the short dashed line. Thus, a second set of windows are presented which slide horizontally along the display lines. As discussed above the video source 20 provides serial video data to the buffer 21 and the buffer 21 is continually being updated. For example, the first display line is eliminated when the ninth display line is stored. Hence the window is deflected downsard with each update of the buffer 21.

Figure 7:
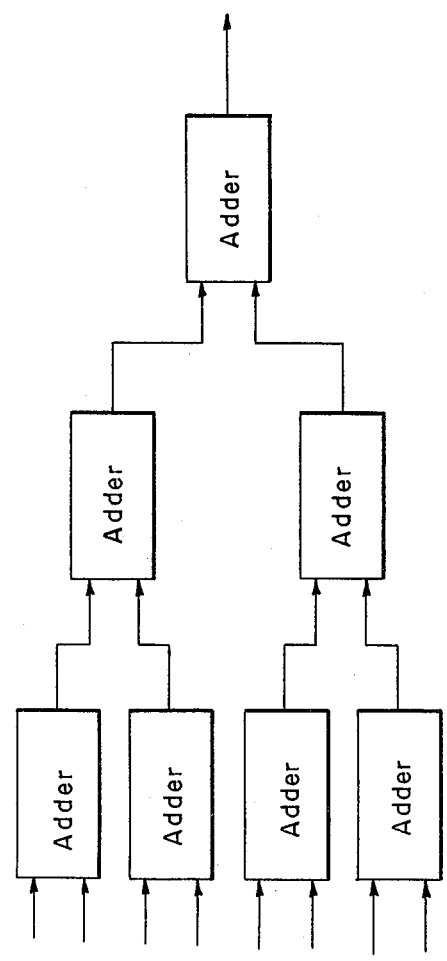
FIG. 7 is a schematic representation of a display screen having a sliding window.

Referring now more specifically to FIG. 7, an average network 25 includes adders 70–73 which receive the accumulated sums from the normalized window accumulators 24a–24h. The adder 70 is connected to accumulators 24a and 24b; the adder 71 is connected to accumulators 24c and 24d. The adder 72 is connected to accumulators 24e and 24f; and, the adder 73 is connected to the accumulators 24g and 24h. The output terminals of adders 70 and 71 are connected to an adder 74, while adder 72 and 73 are connected to an adder 75. The output terminals of adders 74 and 75 are connected to adder 76 whose output in turn is provided through a register 26 of FIG. 1. The accumulators 24a–24h provide the normalized sum of video elements within the respective 8 lines encompassed by the window. The adders 70–73 are connected to the respective accumulators by 6 leads each. Adders 70–73 are connected to respective adders 74 and 75 by 7 leads each. The output signal of adders 70–73 each require an additional lead in order to provide for the case of maximum values being applied to those adders which would result in a sum that is one binary order of magnitude greater. Adders 74 and 75 are connected to adder 76 by eight leads for the same reason as discussed immediately above. Normally the adder would be connected to the register 26 via nine leads for the above-cited reason. But, the average intensity of the eight lines must be obtained from the total intensity in the adder 76. The average intensity is obtained by shifting the binary point three positions to the left which is accomplished by using the only 6 most significant bits. Thus, there is a division by 8 which results in an average brightness value, $k$, for an 8-line by 8-element window.

The average network network 31 is similar to the average network 25 but the former has a greater capacity since it deals with larger numbers.

Referring now to FIG. 7, a timing diagram, illustrates the data sequencing and is discussed in greater detail below.

Figure 8:
FIGS. 8 $a - j$ are waveform and timing diagrams illustrating data flow at preselected points in the circuits according to the invention.

The operation of the invention, according to FIGS. 1 and 2 is now described with respect to those figures and with respect to FIGS. 6 and 8. FIG. 8a illustrates a 10MHz clock signal which is provided by the timing and control network 15 for controlling the flow of data through the system. The video source 20 provides video input data, FIG. 8b, in response to the timing and control signals from the timing and control network 15. The buffer 21 stores the incoming video data, that is, 512 elements in each of eight lines. Thereupon, the first element from each of the eight parallel lines stored in the buffer 21 is applied to the register 22. FIG. 8c illustrates the output sequence of video elements from the first channel of register 22. During the next clock pulse, the second elements are applied to the register 22 and the first ones are shifted out. Thus, the buffer 21 provides the parallel output of the eight display lines until all 512 elements per line have been shifted out. The register 22 shifts each set of corresponding elements at a time to the normalized window accumulators 24a–24h. The accumulators 24a–24h sum the eight elements of the eight parallel lines and each accumulator provides the average intensity of each display line thus accumulated. FIG. 8d illustrates the accumulation of the first channel from accumulator 24a. Accumulator 24b–24h provide similar output signals.

The average network 25 sums the average brightness, k, of the eight parallel channels and provides an average output signal for the entire window, illustrated in FIG. 8e. The average brightness K is stored in the register 26 for further processing. The output of the register 26 is applied to the minus terminal of the subtractor 27. The output signal of delay register line, 28 which has stored the fourth element of the fourth line within the window, is applied to the plus terminal of the subtractor 27 at the proper time. The subtractor 27 thus provides the relative brightness, r, of the center element over the average brightness of the entire window, represented as:

$$r = v_c - k,$$

where $v_c$ is the brightness or intensity of the center element and

The average brightness of a window in register 26 is also applied to the square network 40 which provides the square of the average brightness, $k^2$, which is stored in the register 41. The register 41 in turn applies a signal to the minus terminal of the subtractor 42 illustrated in FIG. 7g. The output signal of the square of the average brightness, $k^2$, from register 41 is represented mathematically as:

$$K^2 = \frac{\left(\sum_{i=1}^{N} v_i\right)^2}{N}$$

where $N$ is 64, for an 8 × 8 window.

Referring back to the intensity squared network 30a, the video data from the register 22 is applied to the square circuit 35a which squares the input signal and the product is stored in the register 36a. The normalized window accumulator 37a receives the output of the register 36a and accumulates the square of the intensity of the eight elements within the first line of a window. The intensity squared networks, 30b–30h, function in parallel with the blank network 30a for corresponding elements in the eight corresponding lines of a window and therefore are not discussed in detail. The average network 31 averages the output of the networks 30a–30h over the eight parallel lines and stores the average in a register 32, illustrated in FIG. 8h. The average of the square of the brightness of the video elements within a window is mathematically as:

$$\frac{\sum_{i=1}^{N} v_i^2}{N}$$

where $N$ is 64 in an 8 × 8 window.

The output of the register 32 is applied to the plus terminal of the subtractor 42 which provides an output that is defined as the variance. The variance is described by:

$$\text{variance} = \frac{\left(\sum_{i=1}^{N=64} v_i\right)^2}{64} - \frac{\sum_{i=1}^{N=64} v_i^2}{64}$$

The ROM 44 in response to the variance input signal from the subtractor 44 provides an output which is defined as the gain, G, for the center element of a window (see FIG. 6i). The gain determines the bias that is to be applied to the center element, $v_c$, of a window on the display.

The gain from the ROM 44 is applied to the register 50, illustrated in FIG. 2. The relative brightness, signal $v_c$, of the center element such as $v_{44}$, of FIG. 6, in the first window is applied to the register 52. The multiplier 51 multiplies the gain, G, by the relative brightness, $v_c$, and provides an output to the register 53, illustrated at FIG. 8j. The register 53 shifts the stored value to one terminal of the adder 54. The second terminal of the adder 54 receives the average brightness k of the window which has been delayed sufficiently that the information in the register 53 and the delay shift register 55 are applied simultaneously to the adder 54. Since the average brightness has been deleted from the value that is eventually stored in the register 53, the average brightness must be replaced to establish the proper dc biasing level. The output of the adder 54 is applied to the DA converter 56 which in turn is used to drive a CRT that displays the video data. Thus, eight elements of eight lines are presented on a display and the bias of the center element is adjusted to enhance the brightness of that element, depending upon the brightness of the other elements within the window.

Referring back to the accumulators 24a–24h, as the ninth elements of the first eight lines are applied to the accumulators, the first elements are subtracted therefrom. Thus, the window slides one element to the right, as illustrated in FIG. 6 by the long dashed lines. The first and second windows overlap each other. For this second window, the average network 25 performs a new calculation and so do networks succeeding. Also, the intensity squared networks 30a–30h perform new calculations for the new window. Thus, the window is slid one element to the right and a revised biased value is applied to the center element of the second window as seen in FIG. 6 and identified as $V_{4,4}$. In the manner just described, the window slides one element to the right at a time and forms the appropriate calculations until all 512 of the first eight lines have entered into the window.

AT the end of the first sweep of the first set of windows having the first eight lines, the window is deflected back to the left-hand side of the display and moved down one line so that the first eight elements of lines 2 through 9 are now within the window. The elements appearing in this second set of lines are computed and the center elements are biased accordingly commencing at the center element located at line 5, element position 4, identified as $v_{5,4}$ in FIG. 5. Thus the first and second sets of sliding windows are also overlaped as do the individual windows of each set.

It should be recalled that the buffer 21 initially stored the first eight lines and 512 elements per line. As the ninth lines applied by the video source 20 to the buffer 21, the first line of the video data is dropped. Thus a second set of windows is presented commencing at lines 2 through 9. The invention, according to FIGS. 1 and 2, functions in a manner described above by sliding the window to the right one element at a time until all 512 elements of lines 2 through 9 have been within the second set of windows.

Thus, each of the center elements of each of the windows sliding across the display has its brightness individually adjusted to take into account the avera e brightness and the variance of the 64 elements in a particular window.

It is pointed out that the three elements along all sides are not adjusted as the center elements within the window and these may be simply blanked out on the display. The first three and last three elements along all the display lines are not displayed along with the top and bottom three lines.

It should be apparent from the foregoing that the present invention provides a raster display system having an enhanced image. Heretofore, other schemes have been utilized to accentuate the details of an image but these schemes were only marginally effective. The system according to the present invention provides a variable gain to the center elements within a window that slides across and down a display. The individually adjusted gain for the center elements emphasizes the difference between the center element and its immediate surroundings so that details are more plainly seen.

Although the present invention has been shown and described with reference to particular embodiments, nevertheless, various changes and modifications obvious to one skilled in the art to which the invention pertains· are deemed to be within the purview of the invention.

The window according to the invention includes a small portion of an entire image or raster and is defined by $v$ video elements in a horizontal direction and l lines in a vertical direction. The entire image or raster includes $V$ video elements per line and L lines per raster, where V is greater than $v$ and L is greater than l. Initially the first full window will contain video elements 1, 2, 3 . . . to $v$ of lines 1, 2, 3 . . . l. The gain of the center element is determined by the intensity of the entire window and the intensity of a particular element within the window. The window is then moved along the horizontal by $\Delta V$ elements which may equal between 1 on $v$ elements. Thus the next full window contains video elements 1+$\Delta V$, 2+$\Delta V$ . . . to $v+\Delta$ for lines 1 through l. The window is moved 1 V elements at a time until all V elements of lines 1 through l have entered into the window.

The window is then deflected in the vertical direction by $\Delta L$ lines so that the full window again contains video elements 1, 2, 3 . . . to $v$ for lines 1+$\Delta L$, 2+$\Delta L$ . . . l+$\Delta L$. The amount that the window is deflected in the vertical direction may equal between 1 and l lines. The window is thereupon moved $\Delta V$ elements as before.

What is claimed is:

1. A raster display system having an enhanced image, comprising:
   input means;
   computing means coupled to said input means for computing the average intensity of elements within a window;
   sliding means coupled to said computing means for sliding said window;
   output means coupled to said sliding means for adjusting the intensity of an element within a window in response to the average intensity of the elements within said window; and
   display means coupled to said output means.

2. A raster display system having an enhanced image, comprising:
   input means;
   computing means coupled to said input means for computing the average intensity of elements within a window;
   sliding means coupled to said computing means for sliding said window;
   means coupled to said computing means for controlling the gain of a central element within said window; and
   output means coupled to said sliding means for displaying said image.

3. A raster display system according to claim 1, comprising:
   means coupled to said first computing means for sliding said window horizontally along said predetermined lines, adding a preselected number of corresponding elements at a time.

4. A raster display system utilizing a sliding window effect for enhancing details of an image, comprising:
   video input means providing video signals representing a plurality of elements in a first direction and a plurality of lines in a second direction said video input means for defining successive windows each having a predetermined number of elements and lines wherein a first set of successive windows lie in said first direction and immediately succeeding windows overlap each other, and a parallel second set of successive windows lie in said first direction, said first and second sets overlap each other;
   first computing means coupled to said video input means for computing the average intensity of elements within a particular window;
   second computing means coupled to said video input means and said first computing means for controlling the gain of a particular element within a particular window in response to the average intensity of a particular window and the intensity of an element within said window; and
   output means coupled to said second computing means for applying said gain to a display.

5. A raster display system according to claim 4, comprising:
   means coupled to said first computing means for sliding said window horizontally along said predetermined lines, adding a preselected number of corresponding elements at a time.

6. A raster display system, comprising:
   memory means for storing video data in a predetermined format;

register means having a plurality of parallel channels coupled to said memory means for providing corresponding video elements on said parallel channels;

a plurality of summing means coupled to said register means for summing the intensity of a predetermined number of corresponding elements from said plurality of parallel channels defining a window, averaging means coupled to said plurality of summing means for providing the average intensity of a window;

subtracting means coupled to said averaging means and said register means for subtracting the average intensity of window from the intensity of an element within said window;

computing means coupled to said register means and to said averaging means said computing means for computing the gain for said element within said window; and output means coupled to said computing means and to said subtracting means, said output means adjusting the bias of said element within said window.

7. A display system having a raster with L lines in a first direction and V video elements in a second direction per line, comprising:

video input means providing order signals representing a portion of a raster, said video input means defining successive windows having l lines and v video elements per line l, said window veing moved along said l lines by $\Delta V$ elements at a time in said second direction, said window being moved by $\Delta V$ lines at a time in said first direction;

first computing means coupled to said video input means for computing the average intensity of elements within a particular window;

second computing means coupled to said video input means and said first computing means for controlling the gain of a particular element within a particular window in response to the average intensity of a particular window and the intensity of an element within said window; and output means coupled to said computing means for applying said gain to a display.

* * * * *